United States Patent [19]

Langen et al.

[11] 4,237,581

[45] Dec. 9, 1980

[54] METHOD AND DEVICE FOR COMPRESSING MEAT

[76] Inventors: Johannes C. Langen, 56; Jan van Cuykstratt; Christianus P. Langen, 11 Zandkampen, both of Cuyk, Netherlands

[21] Appl. No.: 957,350

[22] Filed: Nov. 3, 1978

[51] Int. Cl.³ .............................................. A22C 11/06
[52] U.S. Cl. .......................................... 17/45; 17/38; 17/40
[58] Field of Search .......................... 17/45, 38, 39, 40

[56] References Cited

U.S. PATENT DOCUMENTS

| 78,555 | 1/1868 | Troxell | 17/38 |
| 2,889,574 | 6/1959 | Thielen et al. | 17/39 X |
| 3,473,189 | 10/1969 | Middleton | 17/39 X |
| 4,097,962 | 7/1978 | Alley et al. | 17/39 |

*Primary Examiner*—Willie G. Abercrombie
*Attorney, Agent, or Firm*—John P. Snyder

[57] ABSTRACT

Apparatus for and a method of extracting the liquid component from a product by placing the product in one of a pair of adjacent side-by-side generally parallel compression chambers having a common wall, moving the common wall transversely of the longitudinal axes of the chambers to reduce the volume of one of the chambers thus compressing the product therein and forcing the liquid component from the product, and conducting the liquid component from the first to the second chamber as the product is being compressed in the first chamber.

25 Claims, 4 Drawing Figures

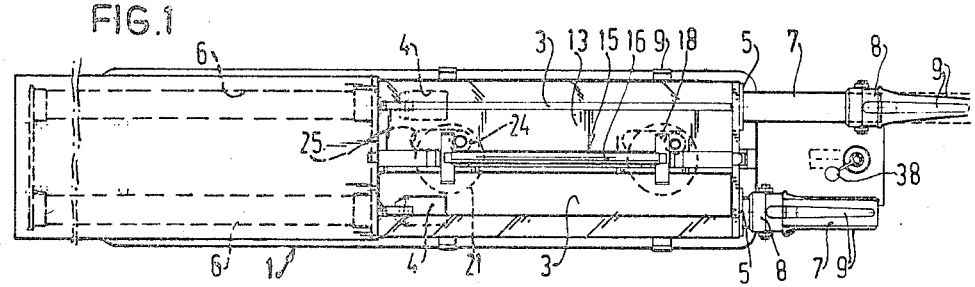
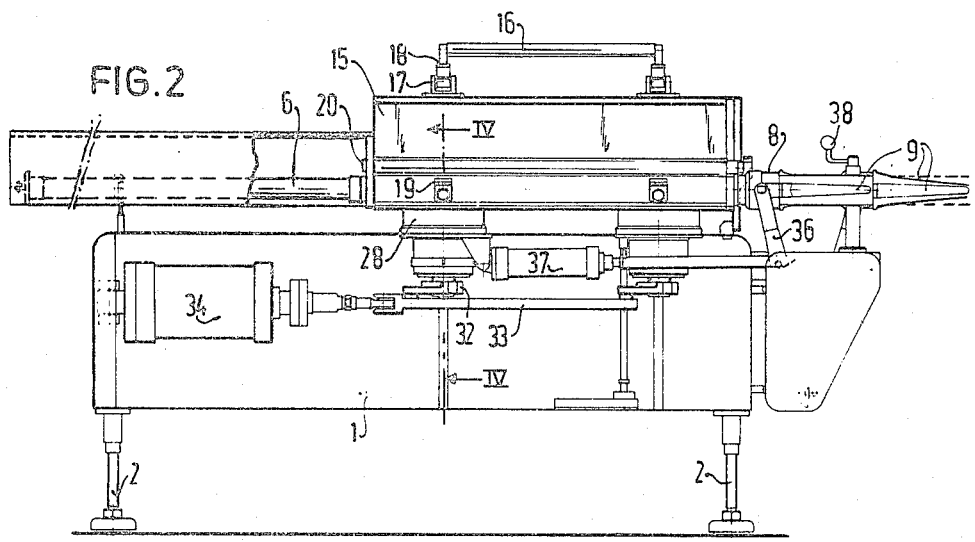
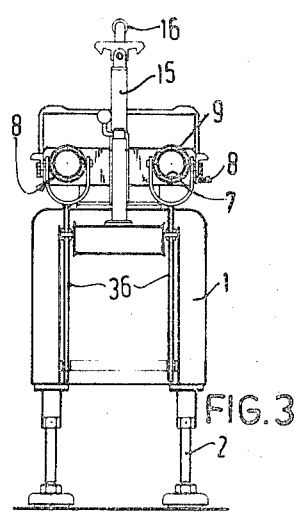
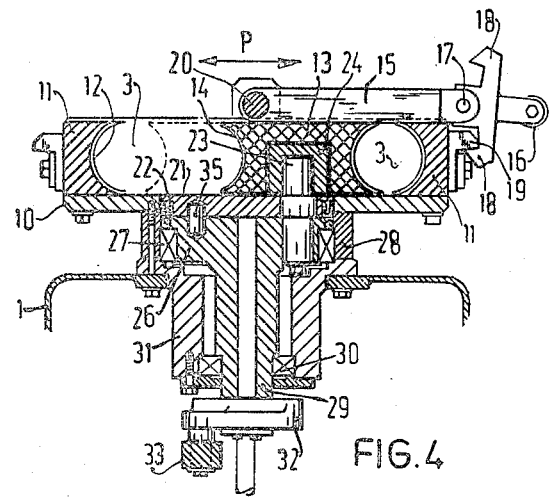

METHOD AND DEVICE FOR COMPRESSING MEAT

The invention relates to a method and a device for compressing meat.

For compressing portions of meat, for example, in preparing canned ham it is common practice to use a device comprising one or more pressing cylinders. Individual amounts of meat are introduced into a cylinder, the capacity of which is reduced after which an expelling plunger pushes the compressed meat out of the cylinder through a guide channel into a can, a synthetic foil or the like. During this process a quantity of meat juice gets each time lost, which causes a substantial loss of weight and which is detrimental to the taste of the final product.

The invention has for its object to obviate the aforesaid disadvantage and to prevent loss of meat juice.

This method is distinguished in that portions of meat are pressed in consecutive compression runs in two or more compression chambers into the desired shape, whilst the meat juice released during one compression run is added to a meat portion to be treated in the next compression run.

The device for carrying out said method comprises at least two cylindrical compression chambers, each of which has a lateral opening that can be closed for introducing a meat portion, a wall portion movable in a radial guide for performing the compression run, an expelling plunger axially movable through the cylinder and an outlet opening located opposite the expelling plunger, said device being distinguished in that the radial guide of the movable wall portion of one cylinder is in open communication with the other cylinder and conversely.

With this design particularly simple means permit of feeding the meat juice released from one cylinder into the other cylinder being in the filling position. It is not necessary to provide accurate reading between the movable wall portion of the cylinder and the guide, since the meat juice leaked away along the movable wall portion will be directly collected in the other compression chamber.

In a preferred embodiment the device is equipped with a bottom element provided with relatively spaced cylindrical wall portions, between which the complementary wall portions of the cylinders are adapted to reciprocate on the bottom element, whilst a removable blocking element is arranged opposite the bottom element. In this embodiment the bottom element is the guide for the meat juice pushed by the wall portions displaceable thereon towards the cylinder concerned.

The reciprocatory, complementary, cylindrical wall portions are preferably formed by recesses in two opposite faces of a beam-shaped pressing member.

A particularly simple construction is obtained by constructing the bottom element in the form of a flat plate. The displacement of the beam-like pressing member can be performed by an eccentric disc arranged in said bottom plate. Thus the seal between the eccentric disc and the bottom plate required for preventing leakage of meat juice can be readily ensured.

The blocking element located opposite the bottom element has in a preferred embodiment the shape of a plate adapted to pivot about an axially directed axis located midway between the upwardly extending wall portions.

When one compression cylinder is closed, the other compression cylinder is automatically released for receiving meat portions. By tilting over or turning the closing plate towards the other cylinder the first cylinder is again automatically released.

The invention will be described more fully hereinafter with reference to an embodiment.

The drawing shows in

FIG. 1 a plan view of the meat press in accordance with the invention,

FIG. 2 a side elevation of the device of FIG. 1,

FIG. 3 a front view of the device of FIG. 1,

FIG. 4 a sectional view taken on the line IV—IV in FIG. 2.

The device shown in the Figures comprises a cabinet-like substructure 1 standing on four legs 2. On top of the cabinet-like structure or cabinet 1 two cylindrical compression chambers 3 are arranged side by side and parallel to one another, an expelling plunger 4 being axially movable in each cylinder towards an opposite outlet aperture 5. The plunger 4 is reciprocated by means of a pneumatic cylinder 6 arranged on the left-hand side of the compression chambers 3 above the cabinet-like substructure 1. The outlet aperture of each compression chamber 3 is prolonged by a tubular stub 7, along the outer circumference of which a ring 8 can be shifted in an axial sense, to which ring tags 9 are secured. These tags serve to facilitate positioning of a tubular synthetic foil or artificial casing around the stub 7 for receiving the compressed meat portion. Each ring 8 is shifted to and fro by means of a lever 36, the lower end of which is pivoted to the cabinet-like structure or frame 1 and which is actuated by an associated pneumatic cylinder 37. These weighing cylinders are controlled by means of a control-knob 38.

There now follows a description of the compression chamber section proposed by the invention; this section is shown in detail in FIG. 4. The section comprises a bottom plate 10, along the longitudinal edges of which a beam-like element 11 is arranged, the surfaces of the beams 11 facing one another forming a cylindrical sheath 12. Between these beam-like elements 11 a displaceable, beam-like element 13 can be shifted to and fro in the direction of the arrow P between the stationary longitudinal beams 11. The remote surfaces of the beam-like element 13 exhibit a cylindrical shape 14 complementary to the cylindrical wall portions 12 so that in the closed state of the compression chamber 3, as shown on the right-hand side of FIG. 4, a substantially circular cross-section is obtained. This circular cross-section corresponds with that of the outlet stub 7 and with that of the outer circumference of the expulsion plunger 4.

Opposite the bottom plate 10 a blocking element 15 is arranged so as to be tiltable about an axially extending shaft 20 through 180° from the position shown in FIG. 4 towards the left-hand beam-like element 11. For this purpose the edge portion of the plate 15 remote from the shaft 20 is equipped with a handle 16, which is pivotable with respect to the plate blocking element or 15 near the shaft 17. The handle 16 is provided with lugs 18 snapping into fixed stops 19 on the outer side of the beam-like elements 11 in the closed state FIGS. 1 and 2 show the plate-shaped blocking element 15 in the vertical position.

In order to permit of shifting to and fro the beam-like pressing member or element 13 in the direction of the arrow P the bottom plate 10 includes two round discs 21. Between the outer circumference of the disc 21 and the circular hole in the bottom plate 10 is provided a fluid-tight seal 22. The plate 21 is provided at an eccentrical point with a pin 23 pressed in the plate and projecting on top into a sliding member 24, which is adapted to reciprocate in a slot-like cavity 25 in the pressing member 13 (see also FIG. 1). On the bottom side the pin 23 is held in a flange 26, which is coaxial with the disc 21 and which is fixed by means of bearings 27 in a frame portion 28 located between the cabinet-like substructure 1 and the bottom plate 10. The flange 26 is prolonged downwardly by a hub-like portion 29, which is rotatably supported by means of bearings 30 in a sleeve-like frame portion 31 extending into the cabinet-like substructure 1.

The bottom side of the hub-like portion 29 is fastened to a lever 32, which can be turned through a given angle by means of a push rod 33 pivoted to said lever. The push rod 33 is actuated by a pneumatic cylinder 34 arranged in the cabinet-like substructure 1 (see FIG. 2).

An additional fastening element is formed by a pin 35 between the flange 26 and the plate 21.

The device operates as follows:

An operator slips a sleeve of synthetic foil on the tags 9 occupying the extended position i.e. the upper position in FIG. 1. By turning over the handle 38 the tags are slid back into the lower position (FIG. 1) so that the synthetic foil is slipped onto the tubular stub 7.

A further operator has in the meantime filled the opened compression chamber with meat i.e. the left-hand compression chamber of FIG. 4. Subsequently he moves the blocking element 15 to the left in FIG. 4 and thus closes the top side of the left-hand compression chamber. By energizing the cylinder 34 the rod 33 and hence the levers 32 are displaced so that each hub 29 with the flange 26 fastened thereto will turn through a given angle. The flange 26 moves along the plate 21 so that the pin 23 traces a circular path whilst catching along the sliding member 24. As a result of the displacement of the sliding member 24 in the slot 25 the pressing beam 13 will shift to the left in FIG. 4 so that the compression chamber 3 is narrowed. The meat portion is shaped into a form matching the inner circumference of the compression chamber and in the extreme position of the pressing beam 13 the cylinder 6 is energized and the expulsion plunger expels the cylindrically shaped meat portion through the tubular stub 7 into the sleeve slipped onto the same.

The meat juice released during this pressing run will flow away through the gaps between the bottom element 10 and the pressing element 13 and between the pressing element 13 and the top plate 15 respectively towards the right-hand compression chamber in FIG. 4. This right-hand compression chamber 3 is now in the filling position so that the juice is mixed with the meat portion during the next pressing run.

The next pressing run is performed in the manner described above by slipping a synthetic sleeve onto the other tubular stub 7, by tilting back the plate-shaped cover 15 through 180° and by energizing the cylinder 34 in the opposite sense so that the pressing beam 13 will move to the right in FIG. 4 into the position shown herein.

Again meat juice will be released and flow through the aforesaid gaps to the left into the left-hand compression chamber.

It will be obvious that the packing between the pressing beam 13 and the top and bottom plates 15 and 10, respectively, need not be accurate. Moreover, it will be obvious that not any quantity of meat juice gets lost.

The invention is not limited to the embodiment described above. For example, the bottom plate 10 need not be flat and it may have a curved shape. Moreover, a larger number of compression chambers may be arranged side by side and it may be imagined to provide a larger number of pressing beams 13 of the shape shown in FIG. 4 side by side between the upright wall portions 11, in which case two or more pressing beams 13 may, in common, form a compression chamber between them.

Although in this device pneumatic control of the various parts resulting in particularly heavy compression forces with the eccentric disc 21 and the leverage 32 is used, other, for example, electrical or hydraulic drives may be employed.

For the sake of completeness it is noted that the closing plate 15 may be made of transparent material so that the operator can survey the compression effect of a meat portion.

What is claimed is:

1. Apparatus for compressing a product having a liquid component comprising first means for compressing a product and forcing therefrom at least a portion of a liquid component thereof, second means for compressing a product and forcing therefrom at least a portion of a liquid component thereof, means for sequentially operating said first and second compressing means, and means for placing said first and second compressing means in fluid communication such that the liquid component portion being forced from the product during the operation of said first compressing means flows through said fluid communication means into said second compressing means while the latter is inoperative and vice versa.

2. The apparatus as defined in claim 1 wherein said first and second compressing means include first and second adjacent chambers, and said first and second chambers are each defined at least in part by a common movable wall therebetween.

3. The apparatus as defined in claim 1 wherein said first and second compressing means include first and second adjacent chambers defined at least in part by a common movable wall therebetween, and said operating means moves said common movable wall to reduce the volume of said first chamber and simultaneously increase the volume of said second chamber during the operation of said first compressing means and vice versa.

4. The apparatus as defined in claim 1 wherein said first and second compressing means include first and second adjacent chambers defined at least in part by a common movable wall therebetween, first and second opening means for introducing a product into said respective first and second chambers, and means for selectively closing said first and second opening means in alternating fashion.

5. The apparatus as defined in claim 1 wherein said first and second compressing means include first and second adjacent chambers disposed with longitudinal axes thereof in generally parallel relationship, first and second means movable along said first and second chamber longitudinal axes for ejecting compressed products therefrom, said first and second compressing means including movable wall means between and in part defining said first and second chambers, and said operating means move said movable wall means transverse to said longitudinal axes to reduce the volumes of said first and second chambers during the operation of said first and second compressing means.

6. The apparatus as defined in claim 1 wherein said first and second compressing means include first and second adjacent chambers defined at least in part by a common movable wall therebetween, and said common movable wall in part defines said first and second compressing means.

7. The apparatus as defined in claim 1 wherein said first and second compressing means include first and second adjacent chambers defined at least in part by a common movable wall therebetween, and said operating means includes eccentric drive means coupled to said common movable wall for imparting motion thereto.

8. The apparatus as defined in claim 1 wherein said first and second compressing means include first and second adjacent chambers defined at least in part by a common movable wall therebetween, said first and second chambers having respective first and second longitudinal axes disposed in generally parallel relationship, said common movable wall in part defines said first and second compressing means, and said operating means move said common movable wall transversely of said first and second chambers.

9. The apparatus as defined in claim 3 wherein said first and second chambers have respective first and second longitudinal axes disposed in generally parallel relationship to each other, and said common movable wall moves transversely relative to said axes.

10. The apparatus as defined in claim 9 including first and second opening means for introducing a product into said respective first and second chambers generally laterally of said first and second longitudinal axes, and means for selectively closing said first and second opening means in alternating fashion.

11. The apparatus as defined in claim 10 including first and second means movable along said first and second chamber longitudinal axes for ejecting compressed products therefrom.

12. Apparatus for compressing a product having a liquid component comprising a bottom plate, first and second spaced generally parallel beam-like elements carried by said bottom plate, a third beam-like element between and generally parallel to said first and second beam-like elements, said third beam-like element having oppositely facing first and second surfaces opposing respective first and second surfaces of said first and second beam-like elements and defining therewith respective first and second compression chambers having respective first and second longitudinal axes disposed in generally parallel relationship, means for moving said third beam-like element towards said first beam-like element and simultaneously away from said second beam-like element whereby a product in the first compression chamber will be compressed and the liquid component forced therefrom and means for ejecting a product outwardly from said first and second compression chambers in directions parallel to said first and second longitudinal axes.

13. The apparatus as defined in claim 12 including means for conducting the liquid component from the first compression chamber to the second compression chamber during the compression of the product in the first compression chamber.

14. The apparatus as defined in claim 12 including first and second lateral openings between said first and third and second and third beam-like elements respectively through which a product can be introduced into the respective first and second compression chambers, and means for selectively closing said lateral openings.

15. The apparatus as defined in claim 12 including means for conducting the liquid component from the first compression chamber to the second compression chamber during the compression of the product in the first compression chamber, guide means between said third beam-like element and said bottom plate for guiding the movement of said third beam-like element, and said liquid component conducting means is defined by said guide means.

16. The apparatus as defined in claim 12 including first and second product outlets associated with said first and second compression chambers, and said ejecting means include first and second plungers for moving compressed products along said respective first and second longitudinal axes and ejecting the same through said respective first and second product outlets.

17. The apparatus as defined in claim 12 wherein all of said first and second surfaces are generally of a concave partially cylindrical configuration.

18. The apparatus as defined in claim 12 wherein said moving means is an eccentric drive member coupled between said bottom plate and said third beam-like element.

19. The apparatus as defined in claim 12 wherein said moving means is an eccentric drive member coupled between said bottom plate and said third beam-like element, said eccentric drive member is a disc having an axis of rotation, a pin offset from said axis of rotation connected between said disc and said third beam-like element, and means for pivoting said disc about said axis.

20. The apparatus as defined in claim 14 including means mounting said closing means for pivoting movement across said third beam-like element.

21. The method of compressing a product having a liquid component comprising the steps of
  (a) inserting a liquid component containing product into a first chamber of a predetermined volume,
  (b) reducing the predetermined volume to a lesser volume thereby compressing the product and forcing the liquid component therefrom,
  (c) while performing step (b) conducting the liquid component from the first chamber into a second chamber, and
  (d) ejecting an earlier compressed product and the liquid component from the second chamber.

22. The method as defined in claim 21 including the step of
  (e) simultaneously increasing the volume of the second chamber while performing step (b).

23. A method of compressing a product having a liquid component comprising the steps of
  (a) inserting a liquid component containing product into a first chamber of a pair of adjacent chambers having generally parallel longitudinal axes,
  (b) reducing the volume of the first chamber while simultaneously and correspondingly increasing the volume of a second of the pair of chambers to compress the product in the first chamber and force the liquid component therefrom, and
  (c) while performing step (b) conducting the liquid component from the first chamber to the second chamber.

24. The method as defined in claim 23 including the step of
   (d) ejecting an earlier compressed product and the liquid component from the second chamber.

25. The method as defined in claim 23 including the steps of
   (d) inserting a liquid component containing product into the second chamber,
   (e) reducing the volume of the second chamber while simultaneously and correspondingly increasing the volume of the first chamber to compress the product in the second chamber and force the liquid component therefrom, and
   (f) while performing step (e) conducting the liquid component from the second chamber to the first chamber.

* * * * *